(12) United States Patent
Petri et al.

(10) Patent No.: US 10,364,722 B2
(45) Date of Patent: Jul. 30, 2019

(54) METHOD FOR REGULATING AN EXHAUST-GAS AFTERTREATMENT DEVICE OF AN INTERNAL COMBUSTION ENGINE

(71) Applicant: FEV EUROPE GMBH, Aachen (DE)

(72) Inventors: Sebastian Petri, Bonn (DE); Eric Brueckner, Aachen (DE); Ibrahim Can Ozyalcin, Aachen (DE)

(73) Assignee: FEV EUROPE GMBH (DE)

( * ) Notice: Subject to any disclaimer, the term of this patent is extended or adjusted under 35 U.S.C. 154(b) by 3 days.

(21) Appl. No.: 15/786,656

(22) Filed: Oct. 18, 2017

(65) Prior Publication Data

US 2018/0112574 A1 Apr. 26, 2018

(30) Foreign Application Priority Data

Oct. 25, 2016 (DE) .......................... 10 2016 120 291

(51) Int. Cl.
| | |
|---|---|
| *F01N 11/00* | (2006.01) |
| *F01N 3/20* | (2006.01) |
| *F01N 9/00* | (2006.01) |
| *F01N 13/00* | (2010.01) |

(52) U.S. Cl.
CPC ............ *F01N 3/2066* (2013.01); *F01N 3/20* (2013.01); *F01N 3/208* (2013.01); *F01N 9/00* (2013.01); *F01N 11/00* (2013.01); *F01N 11/007* (2013.01); *F01N 13/0093* (2014.06); *F01N 2560/026* (2013.01); *F01N 2610/02* (2013.01); *Y02T 10/24* (2013.01); *Y02T 10/47* (2013.01)

(58) Field of Classification Search
CPC .... F01N 3/208; F01N 3/2066; F01N 13/0093; F01N 2550/02; F01N 2550/03
See application file for complete search history.

(56) References Cited

U.S. PATENT DOCUMENTS

| | | | |
|---|---|---|---|
| 6,192,675 B1 * | 2/2001 | Hirota ................ | B01D 53/9431 422/170 |
| 2008/0216463 A1 * | 9/2008 | Chaineux ........... | B01D 53/9431 60/274 |
| 2011/0023591 A1 * | 2/2011 | Dobson ................ | F01N 3/106 73/114.75 |

(Continued)

FOREIGN PATENT DOCUMENTS

| | | |
|---|---|---|
| DE | 102012220151 A1 | 5/2014 |
| DE | 102013203578 A1 | 9/2014 |
| DE | 102013203580 A1 | 9/2014 |

OTHER PUBLICATIONS

Balland, J. et al., "Control of a Combined SCR on Filter and Under-Floor SCR System for Low Emission Passenger Cars", SAE Int. J. Engines, vol. 7(3):2014, doi: 10.4271/2014-01-1522.

(Continued)

*Primary Examiner* — Jonathan R Matthias
(74) *Attorney, Agent, or Firm* — Dickinson Wright PLLC

(57) ABSTRACT

A method for regulating an exhaust-gas aftertreatment device for an internal combustion engine, wherein respectively one loading state of a first SCR component and of a second SCR component arranged downstream of the first SCR component is determined. The loading state of the second SCR component is regulated by way of a dosing system for dosing a reducing agent.

18 Claims, 2 Drawing Sheets

(56) References Cited

U.S. PATENT DOCUMENTS

Figure 1:
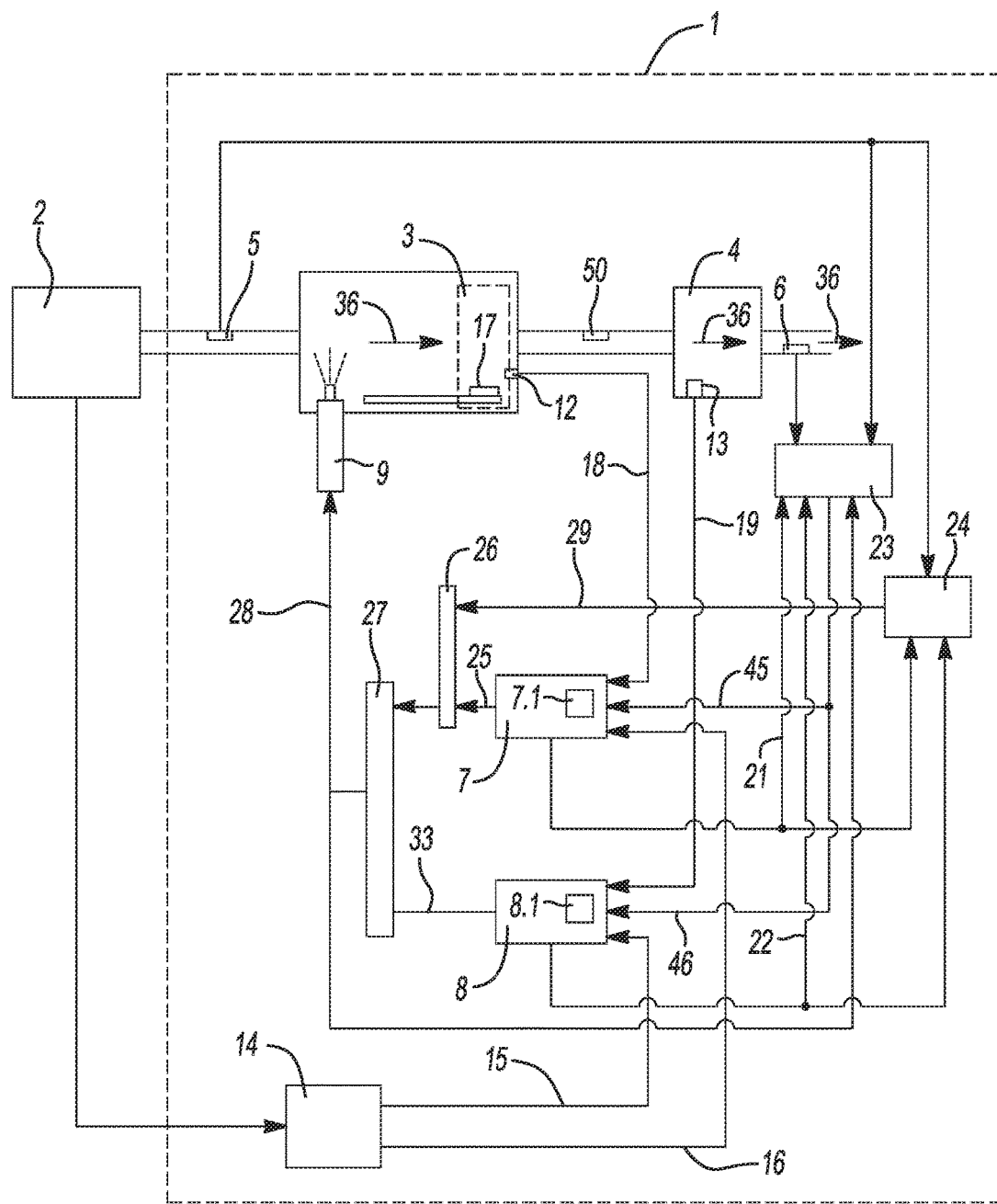

2015/0147250 A1* 5/2015 Nigro .................... F01N 3/2066
  423/212

OTHER PUBLICATIONS

Balland, Jean et al; Control of a Combined SCR on Filter and Under-Floor SCR System for Low Emission Passenger Cars; SAE International Journal of Engines, VOl. 7, 2014, No. 3,10; Published Apr. 1, 2014.

* cited by examiner

METHOD FOR REGULATING AN EXHAUST-GAS AFTERTREATMENT DEVICE OF AN INTERNAL COMBUSTION ENGINE

CROSS-REFERENCE TO RELATED APPLICATIONS

This application claims the benefit and priority of German Application No. 10 2016 120 291.6, filed Oct. 25, 2016. The entire disclosure of the above application is incorporated herein by reference.

FIELD

The invention relates to an exhaust-gas aftertreatment device for an internal combustion engine and to a method for regulating such an exhaust-gas aftertreatment device for an internal combustion engine.

BACKGROUND

This section provides background information related to the present disclosure which is not necessarily prior art.

A method for regulating an exhaust-gas aftertreatment device of the type used with internal combustion engines is known from the publication "Control of a Combined SCR on Filter and Under-Floor SCR System for Low Emission Passenger Cars", Balland et al, SAE Int. J. Engines, Volume 7, Issue 3. This publication describes regulation of an exhaust-gas aftertreatment device having a first SCR component which is arranged in a vicinity of an engine block, and having a second SCR component which is arranged further away from the engine block. Both SCR components have, in dependence on a quantity of stored ammonia, a corresponding loading state. The first SCR component is regulated by way of a control unit in such a way that the first SCR component has as high a loading of ammonia as possible and thus has a high efficiency for a conversion of nitrogen oxides. A target loading of the first SCR component is determined, in this case, in dependence on a detected loading state of the second SCR component.

The detected loading state of the second SCR component is thus able to limit a value range of the target loading of the first SCR component. Consequently, an efficiency of the first SCR component which is to be achieved and an achievable total efficiency of the exhaust-gas aftertreatment device are limited. Within the framework of future stricter exhaust gas regulations, in particular those concerning emissions of nitrogen oxides, such limitations in the achievable total efficiency may be a disadvantage.

SUMMARY

This section provides a general summary of the disclosure and is not a comprehensive disclosure of its full scope or all of its features.

It is therefore the object of the present invention to provide a method for regulating an exhaust-gas aftertreatment device of an internal combustion engine in which method a total efficiency of the exhaust-gas aftertreatment device can be increased.

This object is achieved by a method according to Claim 1 and by an exhaust-gas aftertreatment device according to Claim 10. Further advantageous configurations will emerge from the dependent claims.

In order to achieve this object of the present invention, a method for regulating an exhaust-gas aftertreatment device for an internal combustion engine is proposed, wherein at least one operating state of the internal combustion engine is detected. The exhaust-gas aftertreatment device has a first SCR component, and a second SCR component which is arranged downstream of the first SCR component. The first and the second SCR component are able to be loaded with a reducing agent. In the method, a loading state of the first SCR component and of the second SCR component is detected in each case. Furthermore, an efficiency of the first and/or of the second SCR component is determined by way of an efficiency model in dependence on at least one of the two loading states.

The method also provides that a first target loading of the second SCR component is determined in dependence on the operating state of the internal combustion engine. A first sensor upstream of the first SCR component and a second sensor downstream of the second SCR component are used in each case to detect a nitrogen oxide concentration and/or a concentration of the reducing agent in the form of a first sensor value of the first sensor and of a corresponding second sensor value of the second sensor.

The loading state of the second SCR component is regulated by way of a dosing system for dosing the reducing agent and in dependence on at least the first and the second sensor value and the efficiency. The dosing system is arranged upstream of the first SCR component. When regulating the loading state of the second SCR component, a first reference variable, which is equal to the first target loading, is used.

The first and the second SCR component are components of the exhaust-gas aftertreatment device and which are able to store the reducing agent and to bring about a selective catalytic reaction (SCR) of the reducing agent with a nitrogen oxide (NOX). A nitrogen oxide may be nitrogen monoxide (NO) or nitrogen dioxide (NO2). "Loading" or "unloading" of an SCR component means adsorption on, or desorption of the reducing agent from, the SCR component. A high or low loading state of an SCR component means that the SCR component has a high or low loading with the reducing agent. The reducing agent is preferably ammonia (NH3), which is dosed by way of the dosing system and, following dosing, passes to the first and, depending on the operating state of the internal combustion engine, to the second SCR component. In one non-limiting configuration, the two SCR components are two individual catalysts. In particular, the two SCR components are each sections which have a catalyst material. The catalyst material may comprise iron, copper or vanadium. One of the two or both SCR components may be formed as a vanadium all-active extrudate or as a zeolite with an iron and/or a copper coating. The SCR components may be arranged in the form of a disc or a disc group. For example, it is possible for the first SCR component to be formed as a section of a particle filter which is coated with catalyst material, and for the second SCR component to be formed as an individual SCR catalyst. Furthermore, it falls within the scope of the invention for the first SCR component to form a first section of a catalyst or of a particle filter, and for the second SCR component to form a second section of the same catalyst or of the same particle filter.

The fact that the loading state of the second SCR component is regulated means that a safe value range of a loading of the first SCR component can be changed in a targeted manner. This can increase the efficiency of the first SCR component.

The safe value range of the loading of the first SCR component comprises, in particular, an upper loading limit. In the case of a loading of the first SCR component at the upper loading limit, it is possible for slip of the exhaust-gas aftertreatment device to still just be prevented because of a determined temperature increase of the first and/or of the second SCR component based on the detected operating state of the internal combustion engine. Slip of the exhaust-gas aftertreatment device, or of the first or second SCR component, means the reducing agent is present downstream of the exhaust-gas aftertreatment device, or downstream of the first or second SCR component.

The upper loading limit is, in particular, dependent on the loading state of the second SCR component. The less laden the second SCR component is, preferably the higher the upper loading limit.

An example of regulation of the exhaust-gas aftertreatment device may provide that, in a first detected operating state of the internal combustion engine, a respective first loading state of the first SCR component and of the second SCR component is determined. The first upper loading limit is advantageously determined in dependence on the first loading state of the second SCR component. In the present non-limiting example, the first SCR component has, in the first loading state, a loading equal to the first upper loading limit.

Subsequently, a first target loading of the second SCR component is determined, the first target loading of the second SCR component being lower than a loading in the first loading state of the second SCR component. The loading state of the second SCR component is regulated with the aid of the first target loading, serving as the first reference variable, to the level of the first target loading. Moreover, a second upper loading limit, which is higher than the first upper loading limit, is determined in dependence on the first target loading and advantageously on the determined temperature increase. Afterwards, the loading state of the first SCR component is regulated by way of a second reference variable which is equal to the second upper loading limit. Such regulation of the first SCR component allows the first SCR component to achieve a second loading state which is higher in comparison with the first loading state. In particular, in this higher, second operating state of the first SCR component, it is possible to prevent slip of the exhaust-gas aftertreatment device in the case of the determined temperature increase.

The fact that, in the case of a higher loading, an SCR component has a higher efficiency for a conversion of nitrogen oxide, means that the first SCR component can be operated in the second loading state at a higher efficiency. In the present non-limiting example, following regulation, the second SCR component is operated at a loading state which is lower than the previously determined first loading state. However, a total efficiency of the exhaust-gas aftertreatment device for a conversion of nitrogen oxides can be increased. This is due to the fact that the first SCR component is arranged upstream of the second SCR component and has a higher temperature than the second SCR component. On account of such a temperature difference between the SCR components, an increase in the efficiency of the first SCR component has a stronger influence on the total efficiency than a reduction in the efficiency of the second SCR component.

This effect can be intensified if, in comparison to the first SCR component, the second SCR component has a lower efficiency, in particular a lower quality, under the same thermodynamic boundary conditions. This allows a more cost-effective second SCR component to be used with the proposed method. In particular, a technically high-quality or mediocre second SCR component can be replaced by a comparatively technically inferior second SCR component.

In one particular configuration of the invention, it is provided that a maximum loading of the first SCR component with the reducing agent is determined at least in dependence on a temperature of the first SCR component. Furthermore, the loading state of the first SCR component is regulated, wherein the second reference variable, which is equal to the maximum loading of the first SCR component, is used. If, following regulation of the first SCR component, the first SCR component has the maximum loading, this has the advantage that the first SCR component is operated at as high an efficiency as possible in terms of the temperature of the first SCR component. Consequently, the total efficiency of the exhaust-gas aftertreatment device can be increased. Such an operation of the exhaust-gas aftertreatment device can be made possible in particular by the regulation of the second SCR component.

In one refinement, the dosing system is controlled in such a way that a quantity of the reducing agent reaches the first SCR component, which quantity is larger than a quantity needed for maintaining the loading state of the first SCR component at the maximum loading of the first SCR component. In this case, more reducing agent is present in a region of the first SCR component than can be converted by the first SCR component. As a result, a partial pressure of the reducing agent in the region of the first SCR component is higher than in a situation in which less reducing agent is present in the region of the first SCR component. The increased partial pressure allows the efficiency of the first SCR component to be increased further.

In a further advantageous embodiment, a quantity of the reducing agent released from the first SCR component is determined by way of a first slip model, and the second SCR component is regulated at least in dependence on the released quantity of the reducing agent. The fact that the released quantity of reducing agent is transported downstream to the second SCR component and was previously determined by way of the first slip model means that a targeted loading of the second SCR component can be carried out.

This has the advantage that a second dosing system arranged between the first and the second SCR component may be omitted. Although dosing of the reducing agent into the region of the second SCR component does not occur directly, as would be the case in the case of a second dosing system, this is possible indirectly with the aid of the first slip model in a targeted manner. The loading state and thus the efficiency of the second SCR component can be increased by means of the targeted loading of the second SCR component. Consequently, in contrast with purely passive use of the second SCR component, the total efficiency of the exhaust-gas aftertreatment device can be increased.

For example, such a targeted loading can be advantageous if an operating state of the internal combustion engine with an increased emission of nitrogen oxide is pre-calculated, and a steep temperature increase of the second SCR component, in the case of which high protection against slip of the second SCR component is required, is unlikely. This is possible in the case of low-consumption operation of the internal combustion engine on a level motorway.

Within the scope of the invention, it can particularly advantageously be provided that a safe maximum loading of the second SCR component with the reducing agent, in which slip of the second SCR component is prevented, is determined at least in dependence on a temperature of the second SCR component. Furthermore, the loading state of the second SCR component is regulated by way of the dosing system, wherein the first target loading is equal to the safe maximum loading of the second SCR component. A "safe maximum loading" means in particular that slip of the exhaust-gas aftertreatment device can still just be prevented in the case of a predefined temperature change of an exhaust-gas mass stream in a detected current or pre-calculated operating state of the internal combustion engine. The safe maximum loading of the second SCR component can be calculated by way of a second slip model in dependence on the predefined temperature change. The predefined temperature change is advantageously obtained from a determined scatter band of an exhaust-gas temperature for the determined or pre-calculated operating state of the internal combustion engine.

Operation of the second SCR component in a loading state at the safe maximum loading of the second SCR component has the advantage that firstly the efficiency of the second SCR component is increased, and secondly the second SCR component is protected against slip. Protection of the second SCR component against slip can further be simplified if the second SCR component has higher storage capacity of NH3 and/or lower susceptibility to temperature than the first SCR component. If an NOx sensor and an NH3 sensor are arranged downstream of the second SCR component, then it is possible for a quantity of NH3 exiting the second SCR component to be detected even more accurately. Slip of the second SCR component can thereby be avoided even more safely.

A further configuration of the method provides that, in an operating state of the internal combustion engine in which the internal combustion engine has a rotational speed which is at least half as high as a maximum rotational speed of the internal combustion engine, a flow speed of the exhaust-gas mass stream of the internal combustion engine is determined in the region of the first SCR component. In this operating state, the second SCR component is regulated by way of the dosing system in such a way that unloading of the second SCR component occurs. In such a configuration of the method, at least the efficiency of the first SCR component is determined by way of the efficiency model in dependence on the flow speed of the exhaust-gas mass stream. Dosing of the reducing agent occurs at least in dependence on the efficiency of the first SCR component.

An operating state in which the second SCR component is unloaded is referred to below as an "unloading operating state". In a particular embodiment, it is possible for the internal combustion engine to have a rotational speed in the unloading operating state which is higher than a rotational speed at a maximum torque of the internal combustion engine. Furthermore, in the unloading operating state, the flow speed in the region of the first SCR component is advantageously higher than a flow speed in the region of the first SCR component which is reached at a maximum torque of the internal combustion engine. The comparatively higher flow speed in the region of the first SCR component in the unloading operating state is able to bring about a shorter residence time of the nitrogen oxides in said region in comparison with an operating point in which the maximum rotational speed is reached. Depending on the level of dosing of the reducing agent, this can make it possible for a concentration of nitrogen oxides in the region of the second SCR component to be higher than in the case of a lower flow speed in the region of the first SCR component. Consequently, it is possible that the nitrogen oxide which is present in the region of the second SCR component reacts with a reducing agent which is stored in the second SCR component. This allows the second SCR component to be unloaded in a targeted manner. The advantage of this variant of the method is that the first SCR component does not have to be fully unloaded in order to unload the second SCR component. This effect can be further intensified by way of a substoichiometric dosing of the reducing agent.

One further refinement provides that the exhaust-gas aftertreatment device has a third sensor which is arranged downstream of the first SCR component and upstream of the second SCR component. Here, the second SCR component is regulated in dependence on at least a third sensor value of the third sensor. This has the advantage that a quantity of released reducing agent determined by means of the first slip model can be monitored. For example, it is possible to calculate a deviation between the quantity of NH3 determined by means of the first slip model and released from the first SCR component and a quantity of NH3 detected by means of the third sensor. In dependence on the deviation, an unloading of the second SCR component can be regulated more precisely, or the first slip model can be adapted. The third sensor may be an NOx sensor or an NH3 sensor. If the third sensor is formed as an NH3 sensor, then the slip of the first SCR component can also be determined without the first slip model.

In a further configuration, the second SCR component is flowed against via a bypass. An embodiment of this configuration provides for the exhaust-gas mass stream to flow past the first SCR component. As a result, direct loading and unloading of the second SCR component is possible, and regulation of the loading state of the second SCR component is simplified. In another embodiment, only the reducing agent is passed to the second SCR component via the bypass. This allows direct loading of the second SCR component.

Within the scope of the invention, the efficiency of the first and the second SCR component can be determined by way of kinetic equations and/or at least one characteristic diagram. With the aid of the kinetic equations, in particular an adsorption rate, a desorption rate and/or an oxidation rate of NH3 of the first and second SCR component and a conversion rate of NO2 and NO of the first and second SCR component are determined. Use of the kinetic equations when determining the efficiencies or determining the slip by way of the first or second slip model has the advantage that significant physical effects can be taken into consideration by the efficiency model or the slip models, and high accuracy can be achieved. Use of the characteristic diagram can allow faster calculation in a control unit in comparison with use of the kinetic equations. Advantageously, the characteristic diagram or multiple characteristic diagrams are created with the aid of the kinetic equations prior to operation of the internal combustion engine. Further areas of applicability will become apparent from the description provided herein.

The description and specific examples in this summary are intended for purposes of illustration only and are not intended to limit the scope of the present disclosure.

DRAWINGS

Figure 2:
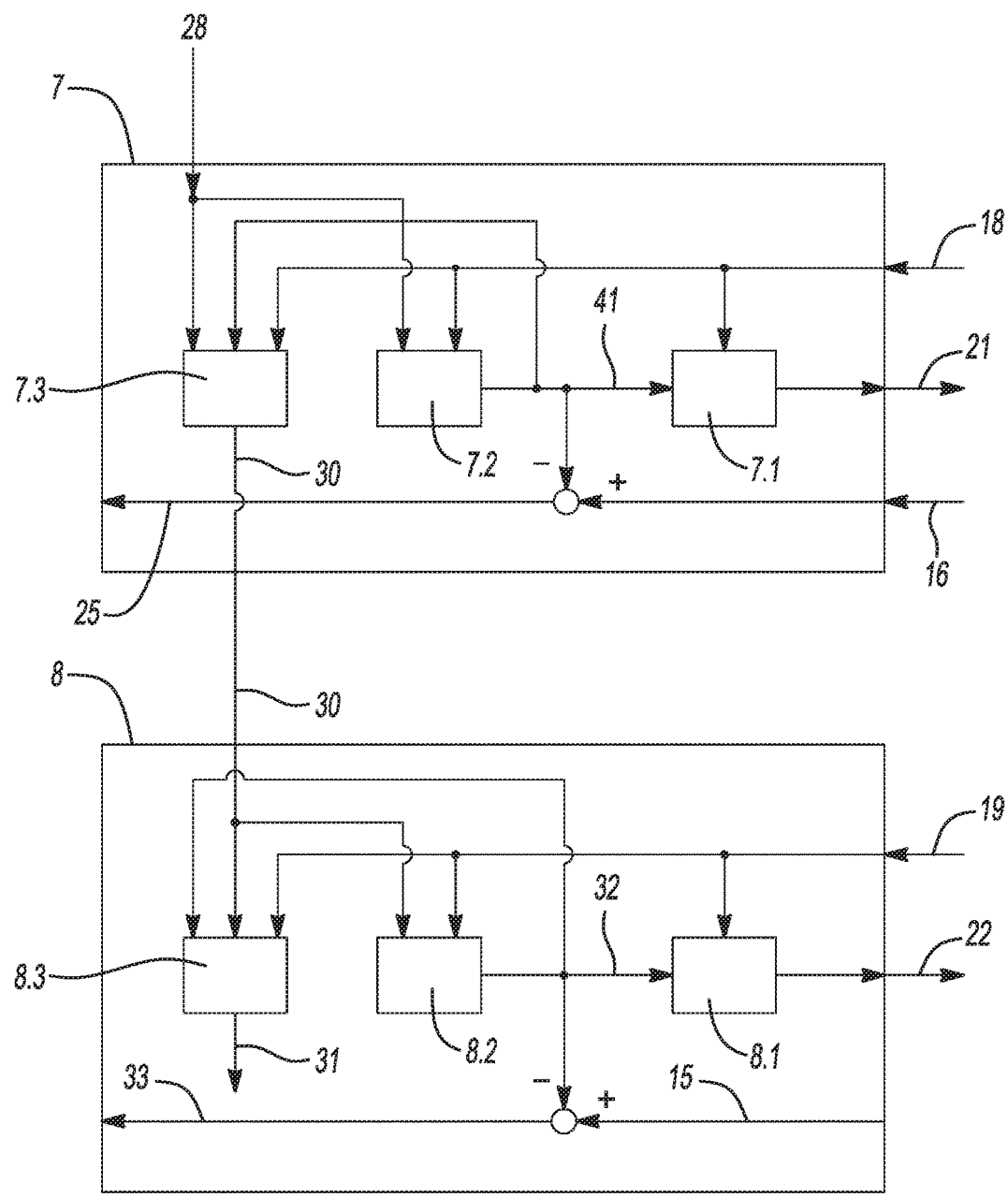

The drawings described herein are for illustrative purposes only of selected embodiments and not all possible implementations, and are not intended to limit the scope of the present disclosure. Further advantages, features and details of the invention will be provided from the written description and the appended drawings, in which:

FIG. 1 shows an exhaust-gas aftertreatment device having two SCR components; and FIG. 2 shows a first and a second regulator.

Corresponding reference numerals indicate corresponding parts throughout the several views of the drawings.

DETAILED DESCRIPTION

Example embodiments will now be described more fully with reference to the accompanying drawings.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Furthermore, there is no intention to be bound by any expressed or implied theory presented in the preceding technical field, background, brief summary or the following detailed description.

FIG. 1 shows an exhaust-gas aftertreatment device 1 for an internal combustion engine 2. An exhaust-gas mass stream 36 of the internal combustion engine 2 flows through the exhaust-gas aftertreatment device 1. The exhaust-gas aftertreatment device 1 includes a first SCR component 3, a second SCR component 4 arranged downstream of the first SCR component 3, a first sensor 5 arranged upstream of the first SCR component 3, and a second sensor 6 arranged downstream of the second SCR component 4. In one particular configuration, the exhaust-gas aftertreatment device 1 includes a third sensor 50. In the embodiment shown in FIG. 1, the first SCR component 3 is formed as a section of a particle filter which has a coating 17 comprising a catalyst material. The first and the second sensor 5, 6 are used in each case to detect an NOx concentration and/or an NH3 concentration in the exhaust-gas mass stream 36.

Furthermore, the exhaust-gas aftertreatment device 1 includes a first regulator 7, a second regulator 8, and a dosing system 9 arranged upstream of the first SCR component 3 and which serves for dosing a reducing agent, preferably NH3. The exhaust-gas aftertreatment device 1 further includes a first efficiency model 7.1 for determining a first efficiency 21 of the first SCR component 3, a first storage model 7.2, and a first slip model 7.3. These three models are referred to below as "first models". The exhaust-gas aftertreatment device 1 also includes a second efficiency model 8.1 for determining a second efficiency 22 of the second SCR component 4, a second storage model 8.2, and a second slip model 8.3. These three models are referred to below as "second models". By way of the first storage model 7.2 and the second storage model 8.2, according to FIG. 2, a loading state 41 of the first SCR component 3 and a loading state 32 of the second SCR component 4, respectively, are modelled and detected.

The exhaust-gas aftertreatment device 1 further includes a target loading module 14 for determining a first target loading 15 of the second SCR component 4, serving as a first reference variable for regulation of the second SCR component 4, and for determining a second target loading 16 of the first SCR component 3, serving as a second reference variable for regulation of the first SCR component 3. The first and the second target loading 15, 16 are preferably determined in dependence on an operating state, detected by way of a control unit of the internal combustion engine 2, of the internal combustion engine 2. The detected operating state may be a current or a pre-calculated operating state. Particularly advantageously, the first and the second target loading 15, 16 are respectively calculated with the first and second models. In a particular variant, the target loading module 14 and the first and/or the second model are integrated in the control unit.

The target loadings 15, 16 are, in particular, determined in such a way that firstly high protection against slip of the exhaust-gas aftertreatment device 1 is provided, and secondly a highest possible total efficiency for a conversion of the nitrogen oxides in the exhaust-gas aftertreatment device 1 is achieved. If for example an operating state is detected in which regeneration of a soot particle filter occurs, then the first and second target load 15, 16 are preferably set equal to zero in order to avoid slip of NH3.

If an operating state is determined in which a steep temperature increase is not to be expected, then the second target loading 16 can be equal to a maximum loading of the first SCR component 3. The first target loading 15 may in this case be equal to a safe maximum loading of the second SCR component 4 in which slip of the second SCR component 4 is still just avoided.

A possible way in which a loading state of the second SCR component 4 can be regulated by way of the dosing system 9 will be described below. For this purpose, a stationary operating state of the internal combustion engine 2 will be considered. Depending on which loading states the two SCR components 3,4 assume different steps of the method for regulating the second SCR component 4 may be carried out.

Below, it will be assumed that the first target loading 15 is equal to the safe maximum loading of the second SCR component 4, and the second target loading 16 is equal to the maximum loading of the first SCR component 3.

The first sensor 5 is used to detect an NOx concentration in the exhaust-gas mass stream 36 upstream of the first SCR component 3 in the form of a first sensor value. Preferably, an NO2 content and an NO content in the exhaust-gas mass stream 36 is determined in a model-based manner, preferably by way of the control unit. On the basis of the NOx concentration and preferably on the basis of the NO and NO2 content, it is possible to calculate a stoichiometric quantity of NH3 with which a total quantity of NO and NO2 in the exhaust-gas mass stream 36 is able to be reduced. This calculation is preferably carried out in a pre-control unit 24.

Furthermore, a first temperature value 18 of the first SCR component 3 and a second temperature value 19 of the second SCR component 4 are detected by way of a first temperature sensor 12 and a second temperature sensor 13, respectively. Based on at least the temperature values 18, 19, the first efficiency model 7.1 and the second efficiency model 8.1 are used to calculate the first efficiency 21 and the second efficiency 22, respectively.

Based on the stoichiometric quantity of NH3, preferably a pre-control quantity 29 of NH3 is determined in consideration of the first efficiency 21 and of the second efficiency 22.

For example, the pre-control quantity 29 may be determined by multiplying the stoichiometric quantity of NH3 by a modelled total efficiency of the exhaust-gas aftertreatment device 1, with the result being a substoichiometric pre-control quantity. The modelled total efficiency is calculated from the first and the second efficiency 21, 22. According to FIG. 2, by way of the first regulator 7, a first difference 25 is formed from the second target loading 16 and the modelled loading state 41 of the first SCR component 3, and is passed on to a third regulator 26. Firstly, the first SCR component 3 should have a loading state 41 in which the first SCR component 3 has a loading equal to the second target loading 16. Preferably, the pre-control quantity 29 is likewise passed on to the third regulator 26.

By way of the second regulator 8, a second difference 33 is formed from the first target loading 15 and the modelled loading state 32 of the second SCR component 4. Firstly, the modelled loading state 32 should equal the first target loading 15, wherein the second difference 33 is equal to zero. The calculated second difference 33 is passed on to a fourth regulator 27. By way of the fourth regulator 27, a dosing quantity 28 is calculated and is transferred to the dosing system 9 and to an evaluation unit 23. The dosing system 9 doses a quantity of NH3, corresponding to the dosing quantity 28, into a region of the first SCR component 3.

In addition to the temperature values 18, 19, the efficiency models 7.1, 8.1 also take into consideration at least the corresponding loading states 41, 32 of the SCR components 3 and 4 and preferably a respective flow speed of the exhaust-gas mass stream 36 in the region of the first SCR component 3 and in a region of the second SCR component 4. The efficiency models 7.1, 8.1 may be formed in particular in the form of characteristic diagrams.

The second sensor 6 is used to detect an NOx concentration in the exhaust-gas mass stream 36 downstream of the second SCR component 4 in the form of a second sensor value. In the evaluation unit 23, a nitrogen oxide balance is performed using the first and the second sensor value. From the result of the nitrogen oxide balance and the dosing quantity 28, an actual total efficiency of the exhaust-gas aftertreatment device 1 for a conversion of nitrogen oxides is determined in the evaluation unit 23. The actual total efficiency is compared with the modelled total efficiency. If, within a predefined tolerance, the actual and the modelled total efficiency are equal, then the dosing quantity 28 is preferably not corrected; otherwise, it is preferably corrected.

Depending on whether the modelled total efficiency is higher or lower than the actual total efficiency, different steps of the method for regulating the second SCR component 4 may be carried out.

Firstly, the case will be considered where the modelled total efficiency is higher than the actual total efficiency. This has the effect that less than the previously determined pre-control quantity 29 of NH3 is consumed in the stationary operating state. The unconsumed quantity of NH3 is stored in the two SCR components, if no NH3-slip of the second SCR component 4 is present. By way of the second slip model 8.2, it is checked whether a slip of the second SCR component 4 is present. Below, it will be assumed that no slip of the second SCR component is present. The unconsumed quantity of NH3 is calculated in the evaluation unit 23 and is divided into a first partial quantity 45 and a second partial quantity 46. Such a division preferably occurs in dependence on the loading states 32, 41 of the SCR components 3, 4. In the present example, the first SCR component 3 has its maximum loading, and so the first partial quantity 45 is equal to zero, and the second partial quantity 46 is equal to the unconsumed quantity of NH3.

With the aid of the second storage model 8.2, the modelled loading state 32 of the second SCR component 4 is corrected, wherein the second partial quantity 46 is added to a previously calculated loading corresponding to the modelled loading state 32 of the second SCR component 4.

Consequently, the difference 33 changes, and so the fourth regulator 27 corrects or, in this example, reduces the dosing quantity 28. The second efficiency model 8.1 models the second efficiency 22 of the second SCR component 4 again, on the basis of the corrected loading state 32.

An amount of a change of the dosing quantity 28 advantageously occurs in dependence on the detected operating state. In order to regulate the loading state of the second SCR component 4 from a level which is higher in comparison with the first target loading 15 to a lower loading state, the dosing quantity 28 is firstly reduced, so that stored NH3 is consumed.

Here, in a first case, the loading state of the second SCR component 4 can decrease directly. This may occur for example if at least the following two thermodynamic conditions are satisfied. Firstly, a flow speed of the exhaust-gas mass stream 36 is of such a high magnitude, or the first efficiency 21 is of such a low magnitude, that the quantity of NO and NO2 in the exhaust-gas mass stream 36 cannot, with the aid of the first SCR component 3, be completely converted. Secondly, less NH3 is present in the exhaust-gas mass stream 36 in the region of the second SCR component 4 than is required for a complete conversion of a residual quantity of NO and NO2 in the second SCR component 4. If both conditions are satisfied, it is possible for NH3 stored in the second SCR component 4 to be broken down directly.

In a second case, it is possible that firstly the total quantity of NO and NO2 in the exhaust-gas mass stream 36 is converted with the aid of the first SCR component 3. The fact that the dosing quantity 28 was previously reduced means that NH3 stored in the first SCR component 3 is broken down. The breaking down of NH3 brings about a reduction of the loading state 41 of the first SCR component 3 and of the first efficiency 21. This process continues until a residual quantity of NO and NO2 reaches the second SCR component 4. If, in addition, less NH3 is present in the exhaust-gas mass stream 36 in the region of the second SCR component 4 than is required for a complete conversion of the residual quantity, the NH3 stored in the second SCR component 4 is subsequently broken down.

The extent to which the NH3 stored in the first and second SCR component 3,4 breaks down can be calculated with the aid of the first and the second model. Particularly advantageously, the thermodynamic states, as are present in the respective region of the first and of the second SCR component 3, 4 in the first or second case, can be produced in a targeted manner by changing the operating state of the internal combustion engine 2 and by controlling the dosing system 9.

In the two cases in which the second SCR component 4 is unloaded, unloading of the first SCR component 3 likewise takes place. For this reason, the dosing quantity 28 is preferably increased again following such unloading of the first SCR component 3, so that the first SCR component 3 is loaded again. Here, the first SCR component 3 is in particular loaded until it has its maximum loading. This occurs advantageously in an operating state of the internal combustion engine 2 in which the thermodynamic conditions, in particular the flow speed of the exhaust-gas mass stream 36, in the respective region of the first and the second SCR component 3, 4 are such that a larger quantity of NH3 is stored in the first SCR component 3 than in the second SCR component 4. A quantity of NH3 which flows from the first SCR component 3 to the second SCR component 4 is calculated by way of the first slip model 7.3.

If the first SCR component 3 has its maximum loading, then, for the purpose of loading the second SCR component 4, a stoichiometric or superstoichiometric quantity of NH3 is preferably dosed. Since the first SCR component 3 can store no more NH3 in this loading state, and the first efficiency 21 is less than one hundred percent, NH3 passes into the second SCR component 4. In this case, a stoichiometric or superstoichiometric dosing of NH3 allows direct regulation of the loading state of the second SCR component 4.

The first slip model 7.3 preferably has the loading state 41 of the first SCR component 3, the first temperature value 18, a flow speed of the exhaust-gas mass stream 36 in the region of the first SCR component 3, and the dosing quantity 28 as input variables, and has a quantity of NH3 30 released from the first SCR component 3 as an output variable. The second slip model 8.3 preferably has the loading state 32 of the second SCR component 4, the second temperature value 19, a flow speed of the exhaust-gas mass stream 36 in the region of the second SCR component 4, and the quantity of NH3 30 released from the first SCR component 3 as input variables, and a quantity of NH3 31 flowing out of the second SCR component 4 as an output variable.

The first storage model 7.2 preferably has the dosing quantity 28 and the first temperature value 18 as input variables. The second storage model 8.2 preferably has at least the quantity of NH3 30 released from the first SCR component 3 and the second temperature value 19 as input variables. In a particular configuration, it is possible for the respective storage models 7.2 and 8.2 to be integrated in the corresponding slip models 7.3 and 8.3.

Below, the case will be considered in which the modelled total efficiency is lower than the actual total efficiency. This has the effect that more than the previously determined pre-control quantity 29 of NH3 is consumed in the stationary operating state. On the basis of the first and second model, it is possible to determine for each SCR component 3,4 a quantity of NH3 which indicates the amount by which the respective loading state 41, 32 of the corresponding SCR component 3, 4 has reduced. The calculated differences 25, 33 change in dependence on the reduced loading states 32, 41, and the dosing quantity 28 is correspondingly increased.

As long as the first SCR component 3 still has not reached its maximum loading, the loading state of the second SCR component 4 is regulated indirectly via the dosing system 9 during the loading of the second SCR component 4. Here, the first regulator 7 is actively operated because the first difference 25 varies over time with the increasing loading state 41 of the first SCR component 3. If the loading state 41 of the first SCR component 3 is equal to the maximum loading of the first SCR component 3, the loading state 32 of the second SCR component 4 is regulated directly via the dosing system 9 during the loading of the second SCR component 4. In this case, the first difference 25 remains constant over time at a value equal to zero, wherein the first regulator 7 is inactive.

If the actual total efficiency deviates from the modelled total efficiency, then such a deviation may be detected as a calculation error. The calculation error may be used to adapt model parameters of the first and second models. Here, for example, for at least one or for each model parameter, a partial derivative of the calculation error with respect to the, or with respect to the respective, model parameter can be calculated. Subsequently, the model parameter(s) can be changed according to the value of the respective partial derivative.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for regulating an exhaust-gas aftertreatment device for an internal combustion engine, wherein
at least one operating state of the internal combustion engine is detected,
respectively one loading state of a first SCR component and of a second SCR component which is arranged downstream of the first SCR component is detected, wherein the two SCR components are able to be loaded with a reducing agent,
an efficiency of the first and/or of the second SCR component is determined by way of an efficiency model in dependence on at least one of the two loading states,
a first target loading of the second SCR component is determined in dependence on the operating state of the internal combustion engine,
a first sensor upstream of the first SCR component and a second sensor downstream of the second SCR component are used in each case to detect a nitrogen oxide concentration and/or a concentration of the reducing agent in the form of a first sensor value of the first sensor and of a corresponding second sensor value of the second sensor,
the loading state of the second SCR component is regulated by way of a dosing system for dosing the reducing agent and at least in dependence on the first and the second sensor value and on the determined efficiency of the first SCR component and/or the second SCR component, wherein a first reference variable, which is equal to the first target loading, is used, and the dosing system is arranged upstream of the first SCR component.

2. The method according to claim 1, wherein a maximum loading of the first SCR component with the reducing agent is determined at least in dependence on a temperature of the first SCR component, and the loading state of the first SCR component is regulated, and wherein a second reference variable, which is equal to the maximum loading of the first SCR component, is used.

3. The method according to claim 1, wherein the dosing system is controlled in such a way that a quantity of the reducing agent reaching the first SCR component is larger than a quantity needed for maintaining the loading state of the first SCR component at a maximum loading of the first SCR component.

4. The method according to claim 1 wherein a quantity of the reducing agent released from the first SCR component is determined by way of a first slip model, and the second SCR component is regulated at least in dependence on the released quantity of the reducing agent.

5. The method according to claim 1 wherein a safe maximum loading of the second SCR component with the reducing agent, in which slip of the second SCR component is prevented, is determined at least in dependence on a temperature of the second SCR component, and the loading state of the second SCR component is regulated by way of the dosing system, wherein the first target loading is equal to the safe maximum loading of the second SCR component.

6. The method according to claim 1 wherein in an operating state of the internal combustion engine in which the internal combustion engine has a rotational speed which is at least half as high as a maximum rotational speed of the internal combustion engine, a flow speed of an exhaust-gas mass stream of the internal combustion engine is determined in a region of the first SCR component, and the second SCR component is regulated by way of the dosing system in such a way that unloading of the second SCR component occurs, and wherein at least the efficiency of the first SCR component is determined by way of the efficiency model in dependence on the flow speed of the exhaust-gas mass stream, and dosing of the reducing agent occurs in dependence on at least the efficiency of the first SCR component.

7. The method according to claim 1 wherein the exhaust-gas aftertreatment device includes a third sensor which is arranged downstream of the first SCR component and upstream of the second SCR component, and wherein the second SCR component is regulated in dependence on at least a third sensor value of the third sensor.

8. The method according to claim 1 wherein the second SCR component is flowed against via a bypass.

9. The method according to claim 1 wherein the efficiency of the first and/or the second SCR component is determined by way of kinetic equations and/or at least one characteristic diagram.

10. An exhaust-gas aftertreatment device for an internal combustion engine, wherein the exhaust-gas aftertreatment device includes a first SCR component, a second SCR component arranged downstream of the first SCR component, a first sensor arranged upstream of the first SCR component to detect a first sensor value representing a nitrogen oxide concentration and/or a reducing agent concentration in an exhaust-gas upstream of the first SCR component, a second sensor arranged downstream of the second SCR component to detect a second sensor value representing an nitrogen oxide concentration and/or a reducing agent concentration in an exhaust-gas downstream of the second SCR component, a first controller, a second controller, an efficiency model for determining an efficiency of the first and/or second SCR component, and a dosing system arranged upstream of the first SCR component and which serves for dosing a reducing agent, wherein the second controller regulates a loading state of the second SCR component at least in dependence on the first sensor value of the first sensor, on the second sensor value of the second sensor, on the determined efficiency of the first and/or of the second SCR component, and on a first target loading of the second SCR component serving as a first reference variable.

11. A method for regulating an exhaust-gas aftertreatment device for an internal combustion engine, the method comprising the steps of:
 detecting at least one operating state of the internal combustion engine;
 detecting one loading state of a first SCR component and of a second SCR component arranged downstream of the first SCR component, wherein the two SCR components are able to be loaded with a reducing agent;
 determining an efficiency of the first and/or of the second SCR component using an efficiency model in dependence on at least one of the two loading states;
 determining a first target loading of the second SCR component in dependence on the operating state of the internal combustion engine;
 detecting a nitrogen oxide concentration and/or a concentration of the reducing agent in the form of a first sensor value of a first sensor and of a corresponding second sensor value of a second sensor, wherein the first sensor is upstream of the first SCR component and the second sensor is downstream of the second SCR component;
 regulating the loading state of the second SCR component by way of a dosing system for dosing the reducing agent at least in dependence on one of the first and the second sensor values and on the determined efficiency of the first SCR component and/or the second SCR component, wherein the dosing system is arranged upstream of the first SCR component.

12. The method according to claim 11, wherein a maximum loading of the first SCR component with the reducing agent is determined in dependence on a temperature of the first SCR component, and wherein the loading state of the first SCR component is regulated.

13. The method according to claim 11, wherein the dosing system is controlled in such a way that a quantity of the reducing agent reaching the first SCR component is larger than a quantity needed for maintaining the loading state of the first SCR component at a maximum loading of the first SCR component.

14. The method according to claim 11 wherein a quantity of the reducing agent released from the first SCR component is determined via a first slip model, and wherein the second SCR component is regulated in dependence on the released quantity of the reducing agent.

15. The method according to claim 11 wherein a safe maximum loading of the second SCR component with the reducing agent is determined at least in dependence on a temperature of the second SCR component, and the loading state of the second SCR component is regulated by way of the dosing system, and wherein the first target loading is equal to the safe maximum loading of the second SCR component.

16. The method according to claim 11 wherein when the internal combustion engine has a rotational speed which is at least half as high as a maximum rotational speed of the internal combustion engine, a flow speed of an exhaust-gas mass stream of the internal combustion engine is determined in a region of the first SCR component, and the second SCR component is regulated by way of the dosing system in such a way that unloading of the second SCR component occurs, and wherein the efficiency of the first SCR component is determined by way of the efficiency model in dependence on the flow speed of the exhaust-gas mass stream, and dosing of the reducing agent occurs in dependence on at least the efficiency of the first SCR component.

17. The method according to claim 11 wherein the exhaust-gas aftertreatment device further includes a third sensor arranged downstream of the first SCR component and upstream of the second SCR component, and wherein the second SCR component is regulated in dependence on at least a third sensor value of the third sensor.

18. The method according to claim 11 wherein the efficiency of at least one of the first and the second SCR components is determined by way of kinetic equations and/or at least one characteristic diagram.

* * * * *